US007089456B2

(12) United States Patent
Gender

(10) Patent No.: US 7,089,456 B2
(45) Date of Patent: Aug. 8, 2006

(54) ERROR RESPONSE TEST SYSTEM AND METHOD USING TEST MASK VARIABLE

(75) Inventor: Thomas K. Gender, Glendale, AZ (US)

(73) Assignee: Honeywell International, Inc, Morristown, NJ (US)

( * ) Notice: Subject to any disclaimer, the term of this patent is extended or adjusted under 35 U.S.C. 154(b) by 764 days.

(21) Appl. No.: 10/161,207

(22) Filed: Jun. 3, 2002

(65) Prior Publication Data
US 2003/0226061 A1   Dec. 4, 2003

(51) Int. Cl.
G06F 11/00 (2006.01)
(52) U.S. Cl. .......................................... 714/41; 714/38
(58) Field of Classification Search ................. 714/41; 717/124; 712/5, 224
See application file for complete search history.

(56) References Cited

U.S. PATENT DOCUMENTS

| | | | |
|---|---|---|---|
| 5,495,571 A * | 2/1996 | Corrie et al. .................. 714/38 |
| 5,668,816 A | 9/1997 | Douskey et al. | |
| 5,701,408 A * | 12/1997 | Cornell et al. ................ 714/38 |
| 5,875,195 A * | 2/1999 | Dixon ........................ 714/719 |
| 6,195,765 B1 * | 2/2001 | Kislanko et al. ............. 714/38 |
| 6,311,299 B1 * | 10/2001 | Bunker ....................... 714/719 |
| 6,484,276 B1 * | 11/2002 | Singh et al. .................. 714/41 |
| 2002/0124217 A1 * | 9/2002 | Hiraide et al. .............. 714/726 |
| 2004/0205717 A1 * | 10/2004 | Chiang et al. .............. 717/124 |

FOREIGN PATENT DOCUMENTS

WO     WO 9966398 A    12/1999

OTHER PUBLICATIONS

Kropp, Nathan et al., "Automated Robustness Testing of Off-the-Shelf Software Components," Fault-Tolerant Computing, 1998, Jun. 23, 1998, pp. 230-239.
Benson, A et al., "A Fault Injection Environment for Microprocessor -based Boards," Proceedings of the International Test Conference 1998. ITC '98, pp. 768-773.

* cited by examiner

Primary Examiner—Scott Baderman
Assistant Examiner—Paul Contino
(74) Attorney, Agent, or Firm—Ingrassia Fisher & Lorenz

(57) ABSTRACT

An error response test system and method with increased functionality and improved performance is provided. The error response test system provides the ability to inject errors into the application under test to test the error response of the application under test in an automated and efficient manner. The error response system injects errors into the application through a test mask variable. The test mask variable is added to the application under test. During normal operation, the test mask variable is set to allow the application under test to operate normally. During testing, the error response test system can change the test mask variable to introduce an error into the application under test. The error response system can then monitor the application under test to determine whether the application has the correct response to the error.

24 Claims, 5 Drawing Sheets

SAMPLE TEST PROCEDURE

```
Procedure Perform_BIT
    write test pattern to a test address
    read pattern from test address ANDing it with TEST MASK VARIABLE
    if data read = data written then
        return pass indicator
    else
        return fail indicator
    end if;
end Perform_BIT
```

FIG. 5

ERROR RESPONSE TEST SYSTEM AND METHOD USING TEST MASK VARIABLE

STATEMENT OF GOVERNMENT INTEREST

The U.S. Government has a paid-up license in this invention and the right in limited circumstances to require the patent owner to license to others on reasonable terms as provided for by the terms of Contract No. NAS15-10000 awarded by the National Aeronautics and Space Administration (NASA), Boeing Subcontract No. 940S9001.

BACKGROUND OF THE INVENTION

1. Technical Field

This invention generally relates to computer systems, and more specifically relates to testing of computer systems.

2. Background Art

Modern life is becoming more dependent upon computers. Computers have evolved into extremely sophisticated devices, and may be found in many different applications. These applications involve everything from application specific computers found in everyday devices such as automobiles, phones and other electronics, to the general purpose computers found in the form of PDAs, personal computers, servers and mainframes.

As computers become more integrated into daily life, their reliability becomes a greater and greater necessity. In order to ensure sufficient reliability it is necessary to thoroughly test computer systems. Thorough testing involves testing both the hardware and software of the computing system to ensure that the system operates properly in a wide range of situations.

One of the more difficult areas in computer system performance to test is the computer system's response to errors in operation. For example, it has been especially difficult to test built-in test routines for response to errors in those routines. The major difficulty in testing a computer's response to errors is in steps that need to be taken to inject the errors into the system. Typically, this has been accomplished with intrusive methods.

For example, a debugger or emulator is used to set breakpoints into the software at which the errors are injected by operator command. These methods are tedious, time consuming and not easily automated. Another method is to instrument the code to cause the error. This involves the creation of a special version of the software that is hard coded to cause the error. This approach raises several issues. The first being that multiple versions of the software must be maintained. The second issue is that the software being tested is no longer the actual operational software, and the actual operational software may in fact respond differently then the test software.

Additionally, it can be especially difficult to inject errors that represent hardware failures. Thus, it can be extremely difficult to evaluate software's response to hardware errors.

For these reasons, the computer system's response to errors may not be tested fully. Instead, only a few manual tests may be performed, and they may not be repeated as the application is modified in the future. Or in some cases, the failure conditions may not be tested at all.

Thus, what is needed is an improved testing system and method that provides for more complete testing of a computer system's response to errors.

DISCLOSURE OF INVENTION

The present invention provides an error response test system and method with increased functionality and improved performance. The error response test system provides the ability to inject errors into the application under test to test the error response of the application under test in an automated and efficient manner.

The error response system injects errors into the application through a test mask variable. The test mask variable is permanently added to the application under test. During normal operation, the test mask variable is set to allow the application under test to operate normally. During testing, the error response test system can change the test mask variable to introduce an error into the application under test. The error response system can then monitor the application under test to determine whether the application has the correct response to the error.

The error response system is particularly applicable to the testing of the software application's response to built-in test routines. In this application, the test mask variable is permanently added to a location in the application software where it can affect the result of the built-in test routine. During normal operation, the test mask variable is set to allow the built-in test routine to function normally. During testing, the error response system can change the test mask variable to a value that interferes with the results of the built-in test routine, causing it to fail. Thus, the software application can be run through the built in test routine, and the application monitored for its response to an error in the built-in test routine.

The error response system thus provides increased testing flexibility and functionality, allowing computer systems to be fully tested to improve the reliability of the computer system.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 5 is a schematic view of a sample test procedure.

BEST MODE FOR CARRYING OUT THE INVENTION

The present invention provides an error response test system and method with increased functionality and improved performance. The error response test system provides the ability to inject errors into the application under test to test the error response of the application under test in an automated and efficient manner.

The error response system injects errors into the application through a test mask variable. The test mask variable is permanently added to the application under test. This has a negligible performance impact on the application, particularly for built-in test routines. During normal operation, the test mask variable is set to allow the application under test to operate normally. During testing, the error response test system can change the test mask variable to introduce an error into the application under test. The error response system can then monitor the application under test to determine whether the application has the correct response to the error.

The error response test system is particularly applicable to the testing of the software application's response to built-in test routines. Built-in test routines are software algorithms, which are part of the software application, whose purpose is to verify the correct operation of a hardware component. They are typically executed upon specific request by a user or they can be run in a background mode, during processor idle times. The test mask variable is permanently added to a location in the application software where it can affect the result of the built-in test routine. During normal operation, the test mask variable is set to allow the built-in test routine to function normally. During testing, the error response system can change the test mask variable to a value that interferes with the results of the built-in test routine, causing it to fail. Thus, the software application can be run through the built in test routine, and the application monitored for its response to an error in the built-in test routine.

Figure 1:
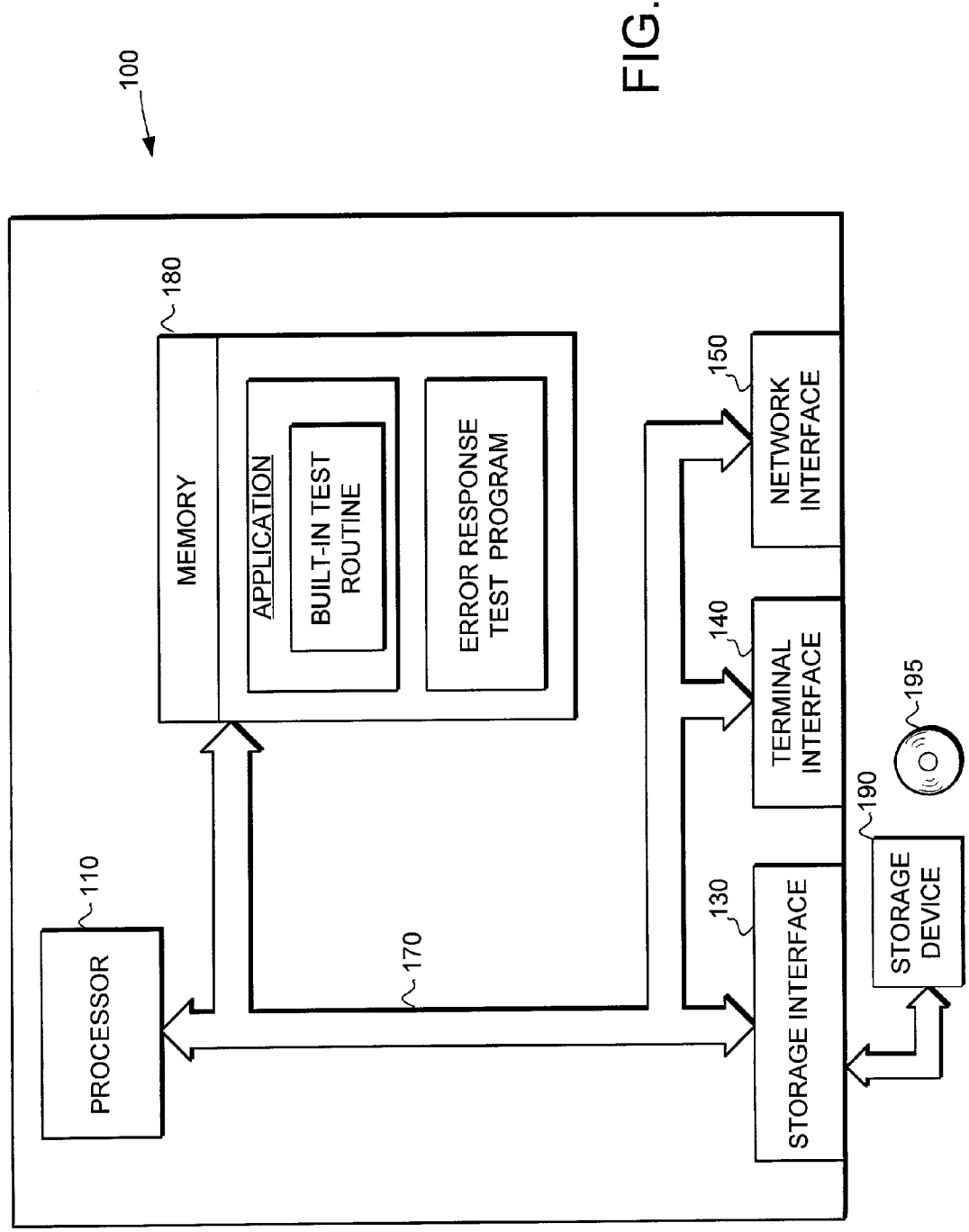
FIG. 1 is a schematic view of a computer system.

Turning now to FIG. 1, an exemplary computer system 100 is illustrated. Computer system 100 illustrates the general features of a computer system that can be used to implement the invention. Of course, these features are merely exemplary, and it should be understood that the invention can be implemented using different types of hardware that can include more or different features. The exemplary computer system 100 includes a processor 110, a storage interface 130, a terminal interface 140, a network interface 150, a storage device 190, a bus 170 and a memory 180. In accordance with the preferred embodiments of the invention, the memory system 100 includes an application under test and an error response test program.

The processor 110 performs the computation and control functions of the system 100. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate computer systems, such as a system where a first processor resides on a target computer system designed to closely resemble the final hardware system and a second processor resides on a test computer system coupled to the target hardware system for testing. During operation, the processor 110 executes the programs contained within memory 180 and as, controls the general operation of the computer system 100.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 100. For example, a portion of memory 180 may reside on the target hardware system and another portion may reside on the test system.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The terminal interface 140 allows users to communicate with system 100, and can be implemented using any suitable method and apparatus. The network interface 150 allows the computer system 100 to communicate with other systems, and can be implemented using any suitable method and apparatus. The storage interface 130 represents any method of interfacing a storage apparatus to a computer system. Storage device 190 can be any suitable type of storage apparatus, including direct access storage devices such as hard disk drives, floppy disk drives and optical disk drives. As shown in FIG. 1, storage device 190 can comprise a CD type device that uses optical discs 195 to store data.

In accordance with the preferred embodiments of the invention, the memory system 100 includes an application under test and an error response test program. During operation, the application under test and the error response test program are stored in memory 180 and executed by processor 110. The error response system injects errors into the application through a test mask variable. The test mask variable is permanently added to a location in the application software where it can affect the result of the built-in test routine. During normal operation, the test mask variable is set to allow the built-in test routine to function normally. During testing, the error response system can change the test mask variable to a value that interferes with the results of the built-in test routine, causing it to fail. Thus, the software application can be run through the built in test routine, and the application monitored for its response to an error in the built-in test routine.

It should again be noted that the preferred implementation of the computer system would typically have the application under test residing on a target computer system that models the production computer system. This provides the most effective test bed for the application under test. The error response test program would typically be located on a separate computer system coupled to the target computer system to allow the error response test program to control and/or monitor the test. Furthermore, in many common applications the target computer system would comprise an embedded system designed as a combination of hardware and software that are integrated together as part of a larger overall system.

The preferred implementation is one in which the test mask variable is stored in a location that can be read and written by the error response test program and is also visible to the application under test. This can be provided by systems that support the real-time reloading of its software or allow special access to internal memory for diagnostic purposes. The test mask variable is inserted into the operation of the application in a location that affects the performance of the application. In one application, the test mask variable is ANDed to a program value, to change the program value during testing but leaves the program value unchanged during normal operation. This changing of the program value is sufficient to interfere with the built-in test routine, causing it to fail.

It should be understood that while the present invention is described in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

Figure 2:
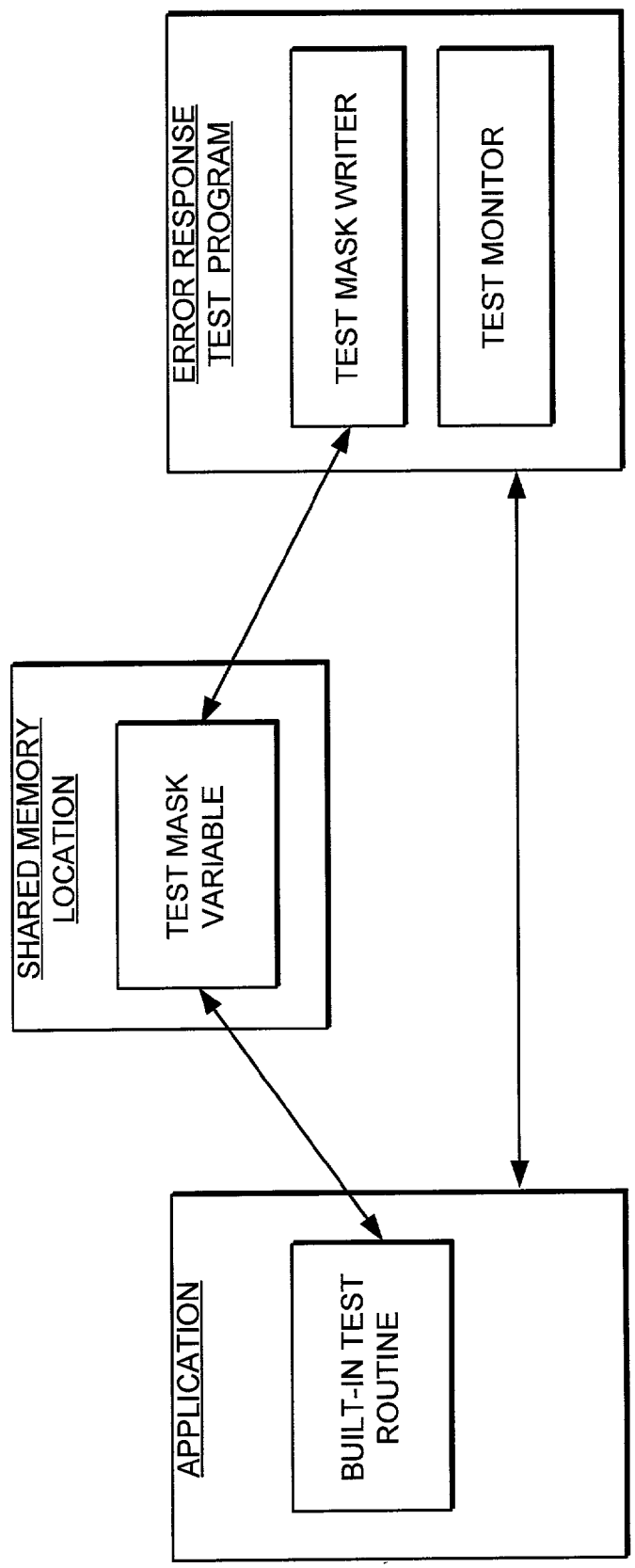
FIG. 2 is a schematic view of a error response test system, application program and test mask variable.

Turning now to FIG. 2, the error response test program and application under test are illustrated schematically to illustrate the interactions between elements. The application includes a built in test routine designed to test the hardware on which the application resides. The error response test program controls testing of the application. In this example, the error response test program will be used to test the application's response to an error in the built in test routine. Of course, the error response test program can be configured to test other features of the application program.

In accordance with the preferred embodiments of the present invention, a test mask variable is located in a shared memory location that can be accessed by both the application and the error response test system. The code of the application is configured to reference the test mask variable during a portion of the execution in a way that can affect the performance of the built in test routine. During normal operation, the test mask variable is set to a value that does not affect the performance of the built-in test routine.

To facilitate testing, the error response test program includes a test mask writer and a test monitor. The test mask writer is used to change the test mask variable to a value that affects the performance of the built in test routine. In particular, the test mask writer is used to change the test mask variable in way that induces an error in the built in test routine that will be recognized by the application program. The test monitor is used to monitor the application's response to the error in the built in test routine.

During testing, the test mask writer changes the test mask variable to a value that will introduce an error into the built in test routine. The error response test program then forces the application to run through the built in test routine while the test monitor monitors the performance of the application. The changed value of the test mask variable causes an error in the built in test routine, the test monitor observes the response of the application. Thus, the error response test program facilitates complete testing of the application's response to errors in the built in test routine.

Figure 3:
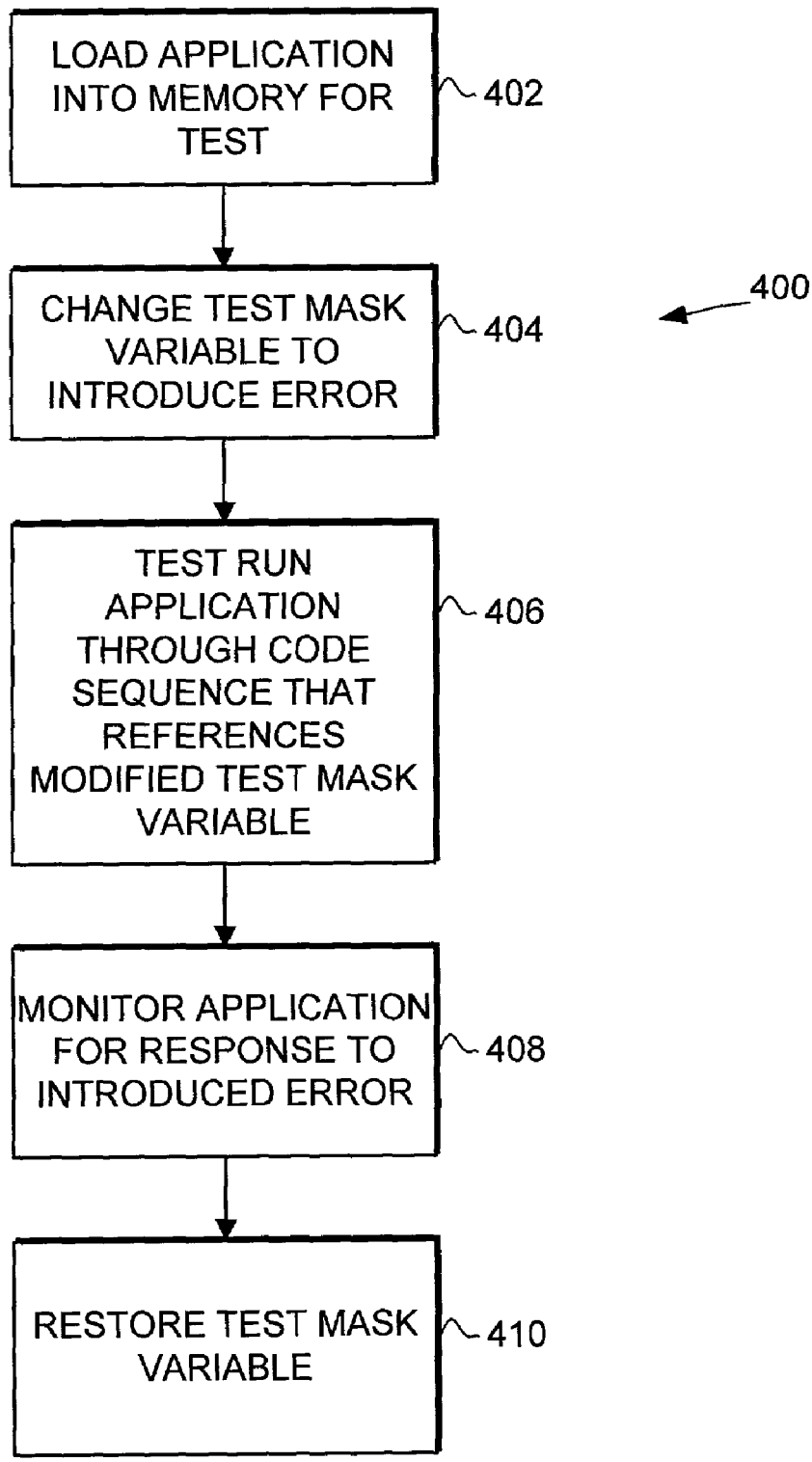
FIG. 3 is flow diagram of a method for testing the error response of an application.

Turning now to FIG. 3, a method 400 of testing an application is illustrated. The test method 400 injects an error into the application and then runs the application while monitoring the response to the introduced errors.

The first step 402 of method 400 is to load the application under test into memory. As stated above, one such embodiment is the testing of an application's response to errors in a built-in test program. The loaded application contains the reference to the test mask variable in the built-in test routine. The code sequence that references the test mask variable can be any sequence of instructions that has a pass/fail impact on the built-in test.

The next step 404 is to change the test mask variable to introduce an error into the application program. The test mask variable can be changed in any way that introduces the type of error that is to be tested. In the built in test routine example, a one bit change in the test mask variable can introduce an error that the built in test routine does not expect, and thus treats as an error in the hardware.

The next step 406 is to test run the application through a code sequence that references the modified test mask variable. This can be accomplished using any suitable code testing technique, such as the many common techniques used to test software. The application is forced to run through the code sequence, and the changed test mask variable introduces an error into the operation of the code sequence.

The next step 408 is to monitor the application's response to the error created. This allows the test error response system to determine if the application responded properly to the error introduced by the modified test mask variable. If the response is correct, the application is known to be robust to this type of failure.

The next step 410 is to restore the test mask variable to a value that does not introduce an error into the system. This can comprise restoring the test mask variable to the original value, or to any other value that does not introduce the tested error. Thus, the application's operation can be returned to the original procedure. This allows the program to again function normally, and allows further testing to proceed. This further testing can then include additional testing by changing additional test mask variables and testing of application response to the errors introduced. In one embodiment, the test mask variable can be restored by the error response test system. In another, it can be restored by the application.

Figure 4:
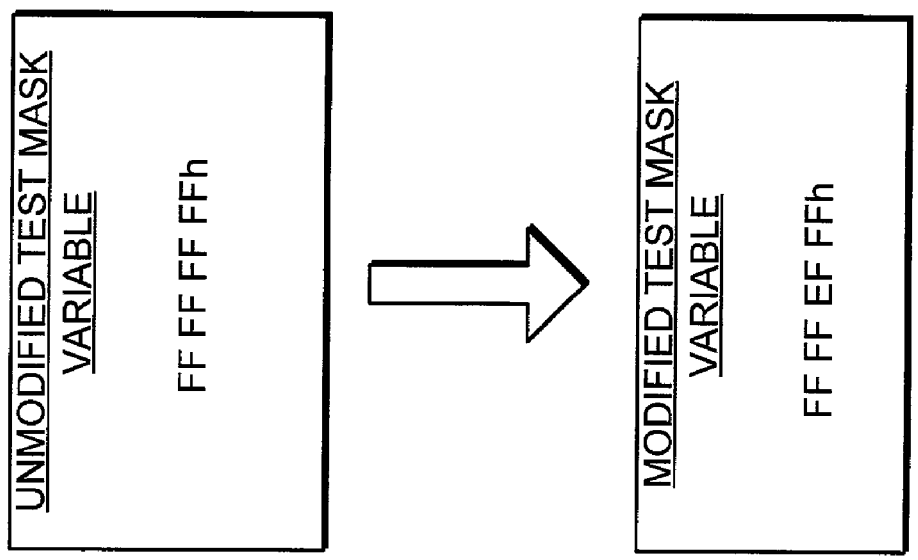
FIG. 4 is a schematic view of a test mask variable before and after modification.

Turning now to FIG. 4, an exemplary unmodified test mask variable is illustrated, and an exemplary modified test mask variable is illustrated. While FIG. 4 illustrates one type of test mask variable, and one type of modification, those skilled in the art will recognize that other variable structures and modifications can be employed. The unmodified test mask variable illustrated in FIG. 4 includes the string FF FF FF FF in hexadecimal. This corresponds to a 32 bit string of ones. Having the unmodified test mask variable comprise a string of ones allows it to be insertable into the application using an AND operation to a program value that in some way affects the program to be tested. Thus, during normal operation of the application, the string of ones ANDed to the program value does not change the value, and the program operates normally.

The exemplary test mask variable has been changed to FF FF EF FF in hexadecimal. Thus, one of the 32 bits has been changed from one to zero. Thus, when the modified test mask variable is ANDed to the program value, the program value is changed. This change in the program value introduces the error into the application program, and thus the application program's response to the error can be tested.

Turning now to FIG. 5, a sample a built-in test procedure is illustrated. In this sample procedure, a memory test is performed by the built-in test. In accordance with an embodiment of the invention, the built-in test procedure includes an ANDing reference to a TEST MASK VARIABLE. Under regular operating conditions, the test mask variable is set to FF FF FF FFh. This causes the built-in test procedure to operate normally. During testing, the error response test system can change the test mask variable to another value and affect the outcome of the test.

As an example, assume that a test pattern AA AA AA AAh is used. During normal testing, the built-in test routine writes that test pattern to a test address. ANDing the test pattern to the TEST MASK VARIABLE does not alter the test pattern. Thus, the built-in test procedure will return a pass indicator (assuming no actual error occurs), operating normally.

During testing of the built-in test procedure, the TEST MASK VARIABLE is altered to another value that will introduce an error. For example, the test driver could set the TEST MASK VARIABLE equal to FF FF FF 00 h. Now, when the built-in test procedure is run, the ANDing of the test pattern to the TEST MASK VARIABLE changes the test pattern to AA AA AA 00 h. Thus, the data read will not equal the data written, and the procedure will return a failed indication. The error response test system can monitor the system's response to the fail indicator, and determine if the response is correct. When the test is complete, the TEST MASK VARIABLE is returned to its original state, and the built-in test routine again operates normally.

As described above, the error response test system is particularly applicable to the testing of the software application's response to built-in test routines. The error response test system and the test mask variable can be used to test the application's response to other types of errors. For example, the error response test system is also applicable to the testing of the application's response to a failure in a polling loop. For example, a data polling technique is often used to detect completion of EPROM programming. Data polling is typically implemented with a polling loop that exits when either programming is complete or when some maximum time has elapsed. By ANDing the test mask variable with the EPROM programming status the polling loop can be forced to exit due to a polling timeout in order to evaluate the application's response to EPROM programming failure.

As another example, the error response test system is also applicable to the testing of the application's response to a checksum failure. Checksums are sometimes used to validate data integrity across data transfers. Another embodiment can compute the checksum of the data in real time and compare it with the expected checksum to check for miscompares. By ANDing the actual or expected checksum with a test mask variable, the application's response to a checksum miscompare error can be evaluated.

Of course, these are merely some examples of the many possible uses of the error response test system and the test mask variable.

The present invention thus provides an error response test system and method with increased functionality and improved performance. The error response test system provides the ability to inject errors into the application under test to test the error response of the application under test in an automated and efficient manner. Because the mask variable reference can be permanently added to the application, it allows testing of the application to be performed without requiring a special test version of the application be instrumented. Additionally, it does not require the use of a special debugger or in-circuit emulator, and can instead be implemented entirely in software. Finally, the present invention can be implemented in a self-checking, automated and repeatable manner. This allows testing to be easily included as part of regularly executed test suites, and ensures that tests can be performed in real time.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An apparatus comprising:
   a) a processor;
   b) a memory coupled to the processor;
   c) an error response test program residing in the memory and being executed by the processor, the error response test program testing an application program, the application program configured to reference a test mask variable during execution of the application program, wherein the application program executes normally when the test mask variable is set to a first value, and wherein the error response test program tests the application program by modifying the test mask variable referenced by the application program, the modified test mask variable introducing an error into the application program when the application program references the modified test mask variable during execution of the application program, the error response test program executing the application program while monitoring the application program's response to an error resulting from the modified test mask variable.

2. The apparatus of claim 1 wherein the test mask variable resides in memory accessible to the error response test program and the application program.

3. The apparatus of claim 1 wherein the test mask variable is referenced by the application program by ANDing the test mask variable to a program value used by the application program.

4. The apparatus of claim 1 wherein the application program includes a built-in test routine and wherein the test mask variable is referenced by the application program ANDing the test mask variable to a program value used by the built-in test routine.

5. The apparatus of claim 1 wherein the error response test program restores the test mask variable to the first value after monitoring the loaded application program's response to an error resulting from the modified test mask variable.

6. The apparatus of claim 1 wherein the loaded application restores the test mask variable to the first value after the loaded application references the modified test mask variable.

7. The apparatus of claim 1 wherein the test mask variable comprises a plurality of bits, with each of the bits comprising a one prior to modification.

8. The apparatus of claim 1 wherein the application comprises a built-in test routine, and wherein the built-in test routine references the test mask variable during testing, and wherein the modified test mask variable causes an error to be detected by the built-in test routine.

9. A method for testing an application program, the method comprising the steps of:
   a) loading the application program into memory, the application program including a reference to a test mask variable, wherein the application program executes normally when the test mask variable is set to a first value;
   b) modifying the test mask variable, the modified test mask variable introducing an error into the application program;
   c) executing the loaded application program such that the modified test mask variable is referenced and an error in the application program introduced; and
   d) monitoring a response of the loaded application program to the error.

10. The method of claim 9 wherein the test mask variable resides in memory accessible to an error response test program and the application program.

11. The method of claim 9 wherein the reference to the test mask variable comprises the application program ANDing the test mask variable to a program value used by the application program.

12. The method of claim 9 wherein the reference to the test mask variable comprises the ANDing the test mask variable to a program value used by a built-in test routine in the application program.

13. The method of claim 9 further comprising the step of restoring the test mask variable to the first value after the step of monitoring the response of the loaded application program to the error.

14. The method of claim 9 further comprising the step of restoring the test mask variable to the first value after the loaded application references the modified test mask variable.

15. The method of claim 9 wherein the test mask variable comprises a plurality of bits, with each of the bits comprising a one prior to the step of modifying the test mask variable.

16. The method of claim 15 wherein the loaded application comprises a built-in test routine, and wherein the built-in test routine references the test mask variable during testing, and wherein the step of executing the loaded application program executes the built-in test routine and wherein the step of monitoring a response of the loaded application program comprises monitoring a response to an error detected by the built-in test routine.

17. A program product comprising:
   a) an error response test program, the error response test program testing an application program, the application program configured to reference a test mask variable during execution of the application program, wherein the application program executes normally when the test mask variable is set to a first value, and wherein the error response test program tests the application program by modifying the test mask variable referenced by the application program, the modified test mask variable introducing an error into the application program when the application program references the modified test mask variable during execution of the application program, the error response test program executing the application program while monitoring the application program's response to an error resulting from the modified test mask variable; and
   b) computer-readable storage bearing media bearing said program.

18. The program product of claim 17 wherein the test mask variable resides in memory accessible to the error response test program and the application program.

19. The program product of claim 17 wherein the test mask variable is referenced by the application program by ANDing the test mask variable to a program value used by the application program.

20. The program product of claim 17 wherein the application program includes a built-in test routine and wherein the test mask variable is referenced by the application program ANDing the test mask variable to a program value used by the built-in test routine.

21. The program product of claim 17 wherein the error response test program restores the test mask to the first value after monitoring the loaded application program's response to an error resulting from the modified test mask variable.

22. The program product of claim 17 wherein the loaded application restores the test mask variable to the first value after the loaded application references the modified test mask variable.

23. The program product of claim 17 wherein the test mask variable comprises a plurality of bits, with each of the bits comprising a one prior to modification.

24. The program product of claim 17 wherein the application comprises a built-in test routine, and wherein the built-in test routine references the test mask variable during testing, and wherein the modified test mask variable causes an error to be detected by the built-in test routine.

* * * * *